UNITED STATES PATENT OFFICE.

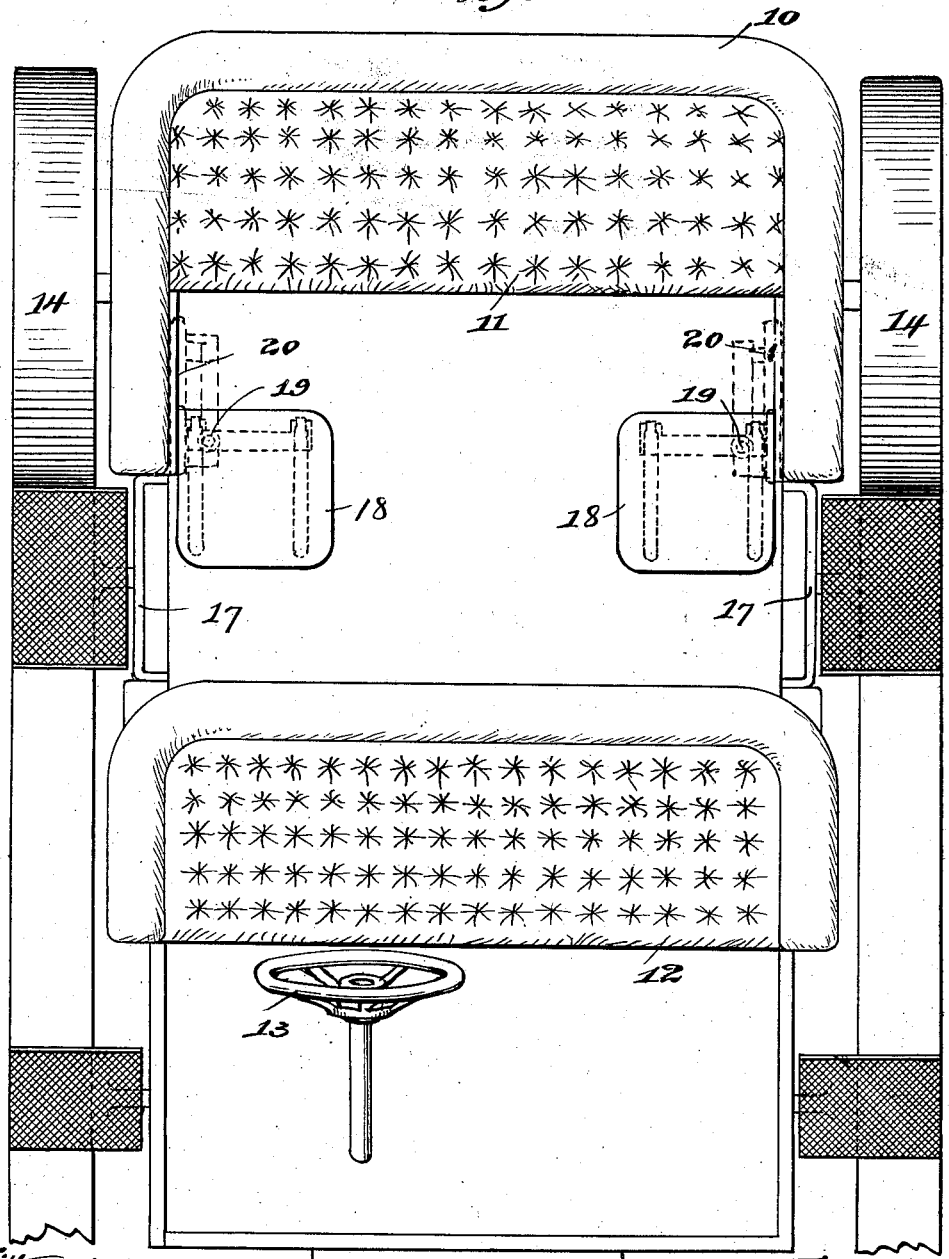

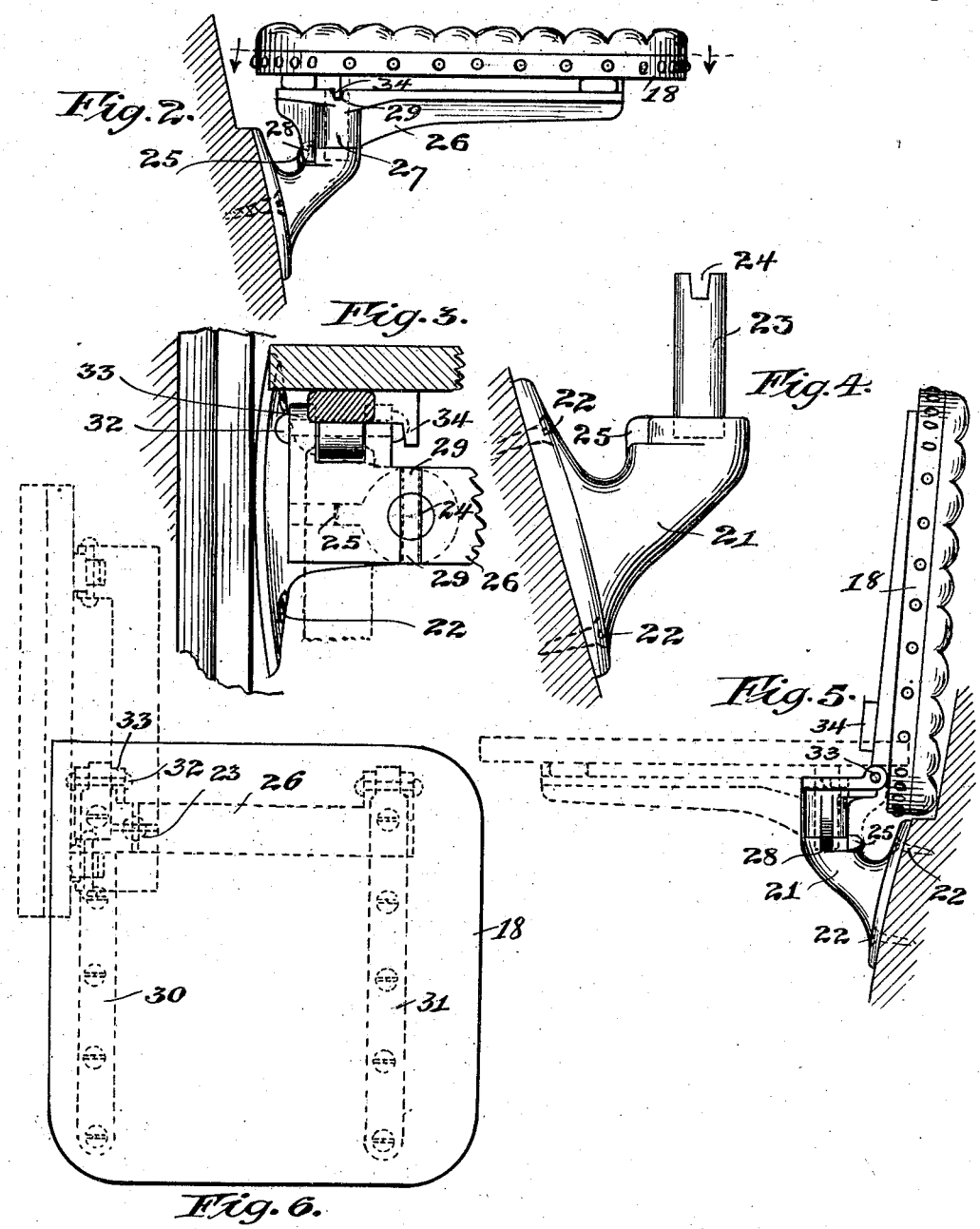

DONALD G. McDIARMID, OF CHICAGO, ILLINOIS.

VEHICLE-SEAT.

No. 820,008.　　　　Specification of Letters Patent.　　　　Patented May 8, 1906.

Application filed September 23, 1905. Serial No. 279,809.

*To all whom it may concern:*

Be it known that I, DONALD G. McDIARMID, a citizen of the United States, residing at Chicago, in the county of Cook and State of Illinios, have invented certain new and useful Improvements in Vehicle-Seats, of which the following is a specification.

My invention relates to seats for vehicles in general, but it is especially directed to improvements in auxiliary seats for automobiles. A seat which can be readily turned down and firmly held in place for occupancy and which when not in use can be raised so as not to obstruct the interior of the vehicle or which can be wholly removed from the same is in demand, and I meet such need in the novel construction described and claimed below.

In the accompanying drawings I have illustrated a preferred embodiment of my invention, like reference characters referring to the same parts throughout.

Figure 1 is a plan view of an automobile equipped with two of my improved auxiliary seats. Fig. 2 is a side elevation of the supporting mechanism for one of these seats. Fig. 3 is a horizontal section through the seat looking downward when the same is in a vertical position. Fig. 4 is a side elevation of the pivot-stud for the seat, showing the side of the vehicle in section. Fig. 5 shows one of the seats pushed back against the side of the vehicle; and Fig. 6 is a plan view of the seat, showing in dotted lines its position when swung around on its pivot-stud and turned up on its hinges against the side of the vehicle.

Referring first to Fig. 1, 10 represents the body of an automobile, having a rear seat 11, a front seat 12, a steering or controlling means 13, fenders 14, steps 15 and 16, and side doors 17, permitting access to the rear seat. Near each door is provided an auxiliary seat 18, pivoted at the point 19, which may be swung into the inoperative position against the side of the vehicle, as shown in dotted lines at 20. The seat comprises for its supporting mechanism a pivot-stud, an arm pivoted thereon, with the seat properly hinged to the arm. The supporting-stud includes a base portion 21, Fig. 4, secured to the side of the automobile or other vehicle by means of screws 22 or similar appliances. Extending upwardly from the base portion 21 is a cylindrical pivot-stud 23, having a transverse slot 24 at its upper end, while part 25 is a stop integral with the base portion 21. Arm 26, which is pivoted on stud 23, has a sleeve 27 fitting over the stud, the sleeve on its rear side being provided with a downwardly-extended projection 28, which is adapted to coöperate with stop 25, the main portion of the arm projecting laterally, as is shown in Fig. 2. On its upper surface arm 26 is provided with two slots 29 in alinement, said slots registering with slot 24 when lug 28 engages stop 25. Two straps 30 and 31 are hinged to arm 26 by means of pivot-pins 32 passing through the ends of the straps and also through the perforated ears 33 of the arm. Strap 30 is supplied with a downwardly-projecting rib 34, adapted to fit in slots 29 and 24 when the seat is in its horizontal position, thereby locking together the stud and arm, so that the latter cannot turn on the former. To the straps is secured seat 18 by means of screws, as is shown in Fig. 6. Assuming that the seat is in its horizontal position and it is desired to fold the same out of the way, the seat is raised into a vertical position, turning on the hinges comprising parts 32 and 33 of arm 26, this elevating of the seat lifting rib 34 away from the slots, thereby unlocking the arm from the stud, so that the seat and arm may be turned to the dotted-line position shown in Figs. 1 and 6. The seat is then against the side of the vehicle, so that it occupies but little space. If instead of folding the seat against the side of the automobile it is desired to remove the same bodily from the vehicle, this can be readily accomplished by lifting the seat, with the attached straps and arm, off the vertical stud 23. When the seat is swung from its inoperative to its horizontal position, lug 28 strikes against stop 25 when slots 24 and 29 register, thus positioning the parts so that when the seat is turned down rib 34 will fit in the slots, thus preventing turning of the seat.

It will be apparent that I have constructed a simple seat which is firmly locked when in operative position, which occupies but little space when folded against the side of the vehicle, and which can be readily removed bodily from the same, if desired.

Various mechanical changes may be made in construction described without departing from the substance of my invention as defined b the appended claims.

I claim—

1. In a device of the character described, the combination of a vertical pivot-stud adapted to be secured to a vehicle, an arm pivoted on said stud and adapted to swing in a horizontal plane, and a seat hinged to said arm adapted to be swung horizontally on said pivot-stud and turned into a vertical plane by means of said hinges, substantially as described.

2. In a device of the character described, the combination of a stationary pivot-stud having a stop, an arm pivoted on said stud, said arm being provided with a lug adapted to coöperate with said stop, and a seat hinged to said arm, substantially as described.

3. In a device of the character described, the combination of a pivot-stud, an arm pivoted on said stud, a seat hinged to said arm, and locking means which prevents said arm turning on said pivot-stud when said seat is in its lowered position and allows said arm to turn on said stud when the seat is raised, substantially as described.

4. In a device of the character described, the combination of a pivot-stud provided with a stop, an arm pivoted on said stud, said arm having a lug to coöperate with said stop, a seat hinged to said arm, and locking means which prevents said arm turning on said stud when said seat is in operative position and allows said arm to turn on said stud when the seat is raised, substantially as described.

5. In a device of the character described, the combination of a pivot-stud having a slot, an arm pivoted on said stud, said arm having a slot, a seat hinged to said arm, said seat having a rib adapted to fit in said slots to prevent said arm turning on said pivot-stud, substantially as described.

6. In a device of the character described, the combination of a pivot-stud having a slot and a stop, an arm pivoted on said stud, said arm having a slot and a lug adapted to coöperate with said stop, a seat hinged to said arm, said seat having a rib adapted to engage said slots to prevent said arm turning on said stud, said rib and slots being in the same vertical plane when said lug engages said stop, substantially as described.

7. In a device of the character described, a pivot-stud comprising a supporting portion adapted to be secured to a vehicle, a stop, and a cylindrical projection having a slot on its end, in combination with an arm having a sleeve rotatable on said stud, said arm having a slot and a lug adapted to engage said stop, a plurality of straps hinged to said arm, one of said straps having a rib adapted to fit in said slots when said lug engages said stop and the strap is in its lowered position, and a seat fastened to said straps, substantially as described.

DONALD G. McDIARMID.

Witnesses:
WALTER M. FULLER,
FREDERICK C. GOODWIN.